United States Patent
Heinonen et al.

(10) Patent No.: US 6,781,801 B2
(45) Date of Patent: Aug. 24, 2004

(54) TUNNELING MAGNETORESISTIVE SENSOR WITH SPIN POLARIZED CURRENT INJECTION

(75) Inventors: Olle Gunnar Heinonen, Eden Prairie, MN (US); Declan Macken, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 202 days.

(21) Appl. No.: 10/054,130

(22) Filed: Jan. 22, 2002

(65) Prior Publication Data

US 2003/0030945 A1 Feb. 13, 2003

Related U.S. Application Data

(60) Provisional application No. 60/311,728, filed on Aug. 10, 2001.

(51) Int. Cl.$^7$ ................................................ G11B 5/39
(52) U.S. Cl. ................................. 360/324.2; 360/324.1
(58) Field of Search .......................... 360/324.2, 324.1; 365/158, 171, 173

(56) References Cited

U.S. PATENT DOCUMENTS

| | | | |
|---|---|---|---|
| 5,629,922 A | 5/1997 | Moodera et al. ............. | 369/126 |
| 5,650,958 A | 7/1997 | Gallagher et al. ........... | 365/173 |
| 5,729,410 A | 3/1998 | Fontana, Jr. et al. ........ | 360/113 |
| 5,764,567 A | 6/1998 | Parkin ......................... | 365/173 |
| 5,801,984 A | 9/1998 | Parkin ......................... | 365/158 |
| 5,838,607 A | * 11/1998 | Zhu et al. ................... | 365/158 |
| 5,898,547 A | 4/1999 | Fontana, Jr. et al. ........ | 360/113 |
| 5,898,548 A | 4/1999 | Dill et al. .................... | 360/113 |
| 5,901,018 A | 5/1999 | Fontana, Jr. et al. ........ | 360/104 |
| 5,966,012 A | 10/1999 | Parkin ......................... | 324/252 |
| 5,966,275 A | 10/1999 | Iijima .......................... | 360/113 |
| 5,996,323 A | 12/1999 | Campbell et al. ............ | 56/6 |
| 6,104,275 A | * 8/2000 | Maeda ........................ | 338/32 R |
| 6,127,045 A | * 10/2000 | Gill ............................. | 428/611 |
| 6,169,303 B1 | 1/2001 | Anthony ...................... | 257/295 |
| 6,178,074 B1 | 1/2001 | Gill ............................. | 360/324.2 |
| 6,232,777 B1 | 5/2001 | Sato et al. ................... | 324/252 |
| 2001/0027603 A1 | * 10/2001 | Komuro et al. ............. | 29/603.14 |
| 2001/0053052 A1 | * 12/2001 | Ihara et al. .................. | 360/324.1 |
| 2002/0064004 A1 | * 5/2002 | Worledge .................... | 360/324.2 |
| 2002/0073785 A1 | * 6/2002 | Prakash et al. .............. | 73/862.041 |
| 2002/0085322 A1 | * 7/2002 | Pinarbasi .................... | 360/324.12 |
| 2002/0126426 A1 | * 9/2002 | Gill ............................. | 360/324.12 |
| 2002/0146887 A1 | * 10/2002 | Liu et al. ..................... | 438/300 |
| 2003/0179510 A1 | * 9/2003 | Hayakawa ................... | 360/324.1 |

FOREIGN PATENT DOCUMENTS

| | | | | |
|---|---|---|---|---|
| EP | 1052520 A1 | * 11/2000 | ............ | G01R/33/09 |
| JP | 09214016 A | * 8/1997 | ............ | H01L/43/00 |
| JP | 09307156 A | * 11/1997 | ............ | H01L/43/08 |
| JP | 2001094172 A | * 4/2001 | ............ | H01L/43/08 |
| JP | 2001202604 A | * 7/2001 | ............ | G11B/5/39 |
| JP | 2002208121 A | * 7/2002 | ............ | G11B/5/39 |
| JP | 2003008104 A | * 1/2003 | ............ | H01L/43/08 |

OTHER PUBLICATIONS

"Spin valve tunnelling," Last update May 1998, on website www.el.utwente.nl/tdm/istg/research/spinvalv/spinvlv3.htm, 2 pages.*

* cited by examiner

*Primary Examiner*—William Klimowicz
(74) *Attorney, Agent, or Firm*—Kinney & Lange, P.A.

(57) ABSTRACT

A tunneling magnetoresistive (TMR) stack configured to operate in a current-perpendicular-to-plane (CPP) mode has a plurality of layers including a spin valve and a barrier layer. The spin valve is used to inject a spin polarized sense current into the barrier layer for increasing a magnetoresistive (MR) ratio of the TMR stack.

17 Claims, 2 Drawing Sheets

TUNNELING MAGNETORESISTIVE SENSOR WITH SPIN POLARIZED CURRENT INJECTION

CROSS-REFERENCE TO RELATED APPLICATION(S)

This application claims priority from Provisional Application No. 60/311,728, filed Aug. 10, 2001 entitled "Tunneling Magnetoresistive Sensor with Spin Polarized Current Injection" by O. Heinonen and D. Macken.

BACKGROUND OF THE INVENTION

The present invention relates generally to a magnetoresistive sensor for use in a magnetic read head. In particular, the present invention relates to a tunneling magnetoresistive (TMR) read sensor having an enhanced magnetoresistive response.

Magnetoresistive read sensors, such as giant magnetoresistive (GMR) read sensors, are used in magnetic data storage systems to detect magnetically-encoded information stored on a magnetic data storage medium such as a magnetic disc. A time-dependent magnetic field from a magnetic medium directly modulates the resistivity of the GMR read sensor. A change in resistance of the GMR read sensor can be detected by passing a sense current through the GMR read sensor and measuring the voltage across the GMR read sensor. The resulting signal can be used to recover the encoded information from the magnetic medium.

A typical GMR read sensor configuration is the GMR spin valve, in which the GMR read sensor is a multi-layered structure formed of a nonmagnetic spacer layer positioned between a synthetic antiferromagnet (SAF) and a ferromagnetic free layer. The magnetization of the SAF is fixed, typically normal to an air bearing surface of the GMR read sensor, while the magnetization of the free layer rotates freely in response to an external magnetic field. The SAF includes a reference layer and a pinned layer which are magnetically coupled by a coupling layer such that the magnetization direction of the reference layer is opposite to the magnetization of the pinned layer. The resistance of the GMR read sensor varies as a function of an angle formed between the magnetization direction of the free layer and the magnetization direction of the reference layer of the SAF. This multi-layered spin valve configuration allows for a more pronounced magnetoresistive effect, i.e. greater sensitivity and higher total change in resistance, than is possible with anisotropic magnetoresistive (AMR) read sensors, which generally consist of a single ferromagnetic layer.

A TMR read sensor is similar in structure to a GMR spin valve, but the physics of the device are different. For a TMR read sensor, rather than using a spacer layer, a barrier layer is positioned between the free layer and the SAF. Electrons must tunnel through the barrier layer. A sense current flowing perpendicularly to the plane of the layers of the TMR read sensor experiences a resistance which is proportional to the cosine of an angle formed between the magnetization direction of the free layer and the magnetization direction of the reference layer of the SAF.

A pinning layer is typically exchange coupled to the pinned layer of the SAF to fix the magnetization of the pinned layer in a predetermined direction. The pinning layer is typically formed of an antiferromagnetic material. In antiferromagnetic materials, the magnetic moments of adjacent atomic planes are aligned in alternating directions and, thus, there is no net magnetic moment in the material.

An underlayer is typically used to promote the texture of the pinning layer consequently grown on top of it. The underlayer is typically formed of a ferromagnetic material and is chosen such that its atomic structure, or arrangement, corresponds with a desired crystallographic direction.

A seed layer is typically used to enhance the grain growth of the underlayer consequently grown on top of it. In particular, the seed layer provides a desired grain structure and size.

One principal concern in the performance of TMR read sensors is the $\Delta R$ (the maximum absolute change in resistance of the TMR read sensor), which directly affects the magnetoresistive (MR) ratio. The MR ratio (the maximum absolute change in resistance of the TMR read sensor divided by the resistance of the TMR read sensor multiplied by 100%) determines the magnetoresistive effect of the TMR read sensor. Ultimately, a higher MR ratio yields a TMR read sensor with a greater magnetoresistive effect which is capable of detecting information from a magnetic medium with a higher linear density of data.

A key determinant of the MR ratio is the spin polarization of the sense current passing through the barrier layer. The sense current consists of majority spin electrons (spin is in the same direction of the magnetization) and minority spin electrons (spin is in the opposite direction of the magnetization). A spin polarized current has an unequal population of majority and minority spin electrons. According to the Julliere model of the TMR read sensor, the magnetoresistive effect in a tunneling junction is significantly enhanced if the sense current is spin polarized. This is because the magnetoresistive effect is determined by $\Delta R/R = 2PP'/(1-PP')$, where $\Delta R/R$ is the MR ratio, and $P$ and $P'$ are the spin polarization ratios of the effective tunneling density of states on each side of the barrier layer. The MR ratio reaches a maximum value for completely polarized tunneling density of states ($P=P'=1$).

The present invention addresses these and other needs, and offers other advantages over current devices.

BRIEF SUMMARY OF THE INVENTION

The present invention is a tunneling magnetoresistive (TMR) stack configured to operate in a current-perpendicular-to-plane (CPP) mode. The TMR stack has a plurality of layers including a spin valve and a barrier layer. The spin valve is used to inject a spin polarized sense current into the barrier layer for increasing a magnetoresistive (MR) ratio of the TMR stack.

DETAILED DESCRIPTION

Figure 1:
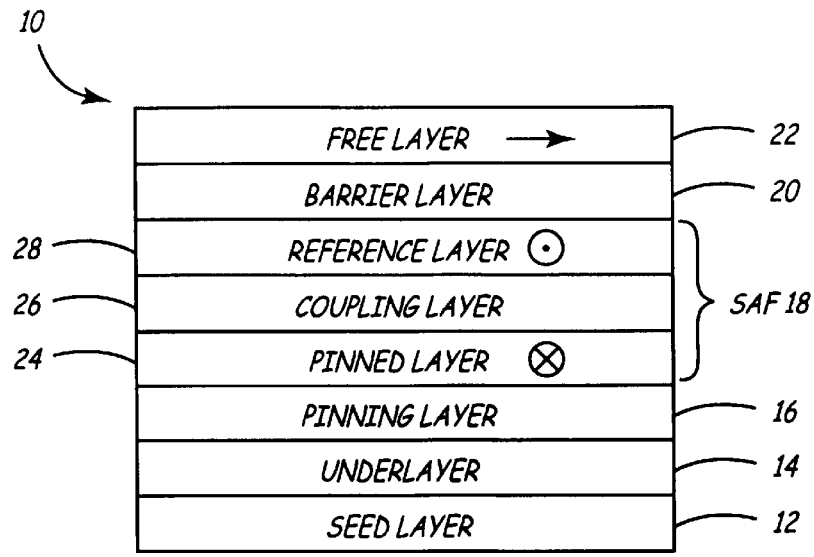
FIG. 1 is a layer diagram of a prior art tunneling magnetoresistive stack.

FIG. 1 is a layer diagram of a prior art tunneling magnetoresistive (TMR) stack 10. TMR stack 10 includes a seed layer 12, an underlayer 14, a pinning layer 16, a synthetic antiferromagnet (SAF) 18, a barrier layer 20, and a free layer 22. Underlayer 14 is a ferromagnetic material and is positioned adjacent to seed layer 12. Pinning layer 16 is an antiferromagnetic material and is positioned adjacent to underlayer 14. SAF 18 includes a ferromagnetic pinned layer 24, a ferromagnetic reference layer 28, and a coupling layer 26 positioned between pinned layer 24 and reference layer 28, and is positioned such that pinned layer 24 is adjacent to pinning layer 16. Free layer 22 is a ferromagnetic material. Barrier layer 20 is an insulating material and is positioned between SAF 18 and free layer 22.

The magnetization of SAF 18 is fixed while the magnetization of free layer 22 rotates freely in response to an external magnetic field emanating from a magnetic medium. Reference layer 28 and pinned layer 24 are magnetically coupled by coupling layer 26 such that the magnetization direction of reference layer 28 is opposite to the magnetization direction of pinned layer 24. The magnetization of pinned layer 24 is pinned by exchange coupling pinning layer 16 with pinned layer 24. Underlayer 14 promotes the crystallographic texture of pinning layer 16, and seed layer 12 enhances the grain growth of underlayer 14. The resistance of TMR stack 10 varies as a function of an angle that is formed between the magnetization of free layer 22 and the magnetization of reference layer 28.

The TMR signal produced by TMR stack 10 is generated by a sense current flowing perpendicularly through the layers of TMR stack 10 from free layer 22 to seed layer 12. The sense current injected into free layer 22 is unpolarized. While it is possible for TMR stack 10 to exhibit a MR ratio greater than 15% by increasing the thickness of barrier layer 20 to 10 Å or more, the resistance-area (RA) product becomes too large (10–100 $\Omega\mu m^2$) to be practically useful for devices for high areal density magnetic recording. The RA product can be reduced by decreasing the thickness of barrier layer 20, but a corresponding decrease in the MR ratio inevitably occurs.

Figure 2:
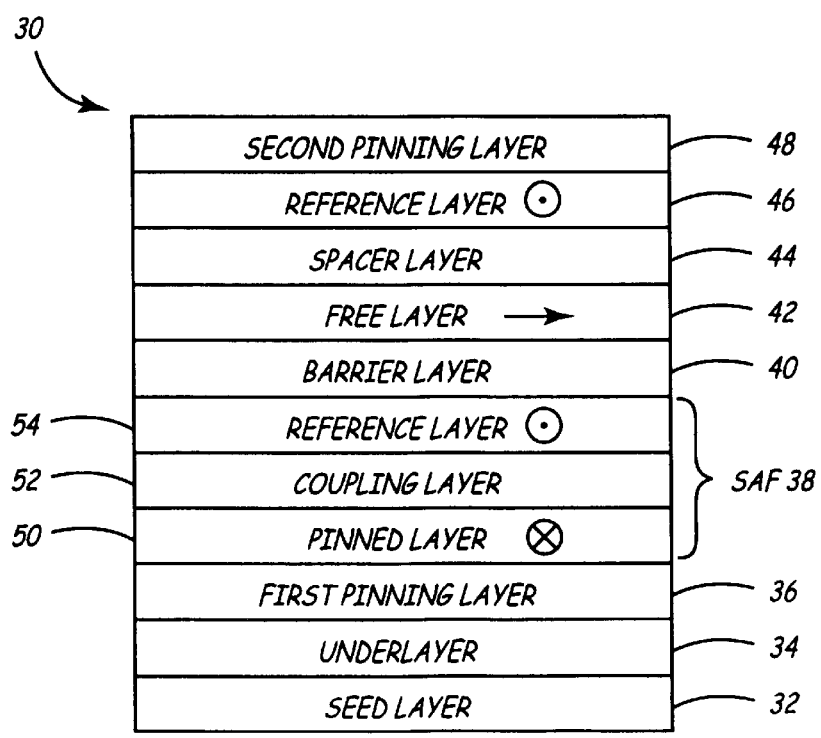
FIG. 2 is a layer diagram of a first embodiment of a tunneling magnetoresistive stack of the present invention.

FIG. 2 is a layer diagram of a first embodiment of a tunneling magnetoresistive (TMR) stack 30 of the present invention. TMR stack 30 includes a seed layer 32, an underlayer 34, a first pinning layer 36, a synthetic antiferromagnet (SAF) 38, a barrier layer 40, a free layer 42, a spacer layer 44, a reference layer 46, and a second pinning layer 48. Seed layer 32 is preferably NiFeCr or Ta. Underlayer 34 is a ferromagnetic material, preferably CoFe or NiFe, and is positioned adjacent to seed layer 32. First pinning layer 36 is an antiferromagnetic material, preferably selected from the group consisting of PtMn, IrMn, NiMn and FeMn, and is positioned adjacent to underlayer 34. SAF 38 includes a ferromagnetic pinned layer 50, a ferromagnetic reference layer 54, and a coupling layer 52 positioned between pinned layer 50 and reference layer 54. SAF 38 is positioned such that pinned layer 50 is adjacent to first pinning layer 36. Pinned layer 50 and reference layer 54 are preferably CoFe, and coupling layer 52 is preferably selected from the group consisting of Ru, Cu and Ag. Free layer 42 is a ferromagnetic material, preferably CoFe or NiFe. Barrier layer 40 is an insulating material, preferably selected from the group consisting of $Al_2O_3$, $Y_2O_3$, $CeO_2$, TaO, SiN, AlN, $CrO_2$, $HfO_2$, and $TiO_2$, and is positioned between SAF 38 and free layer 42. Reference layer 46 is a ferromagnetic material, preferably CoFe. Second pinning layer 48 is an antiferromagnetic material, preferably selected from the group consisting of PtMn, IrMn, NiMn and FeMn, and is positioned adjacent to reference layer 46. Spacer layer 44 is a nonmagnetic material, preferably Cu or Ag, and is positioned between free layer 42 and reference layer 46. Free layer 42, spacer layer 44, reference layer 46, and second pinning layer 48 together form a simple spin valve.

The magnetizations of SAF 38 and reference layer 46 are fixed while the magnetization of free layer 42 rotates freely in response to an external magnetic field emanating from a magnetic medium. The magnetization of reference layer 46 is pinned by exchange coupling second pinning layer 48 with reference layer 46 such that the magnetization direction of reference layer 46 is the same as the magnetization direction of reference layer 54. Reference layer 54 and pinned layer 50 are magnetically coupled by coupling layer 52 such that the magnetization direction of reference layer 54 is opposite to the magnetization direction of pinned layer 50. The magnetization of pinned layer 50 is pinned by exchange coupling first pinning layer 36 with pinned layer 50. Underlayer 34 promotes the crystallographic texture of first pinning layer 36, and seed layer 32 enhances the grain growth of underlayer 34. The magnetization of reference layer 46 is pinned by exchange coupling second pinning layer 48 with reference layer 46. The resistance of TMR stack 30 varies as a function of an angle that is formed between the magnetization of free layer 42 and the magnetizations of reference layers 54 and 46.

The TMR signal produced by TMR stack 30 is generated by a sense current flowing perpendicularly through the layers of TMR stack 30 from second pinning layer 48 to seed layer 32. The sense current injected into second pinning layer 48 is unpolarized. The simple spin valve formed by free layer 42, spacer layer 44, reference layer 46, and second pinning layer 48 acts as an electrode to spin polarize the sense current. Because an external magnetic field from a magnetic medium rotates the magnetization of free layer 42, majority and minority spin electrons scatter at different rates at the interfaces between reference layer 46, spacer layer 44, and free layer 42. The resulting current emanating from free layer 42 to barrier layer 40 is spin polarized due to this spin selective scattering. As a result, the magnetoresistive effect of TMR stack 30 is significantly enhanced without appreciably increasing the RA product. Therefore, it is possible for TMR stack 30 to exhibit a MR ratio greater than 15% with an RA product of only 1–2 $\Omega\mu m^2$.

Figure 3:
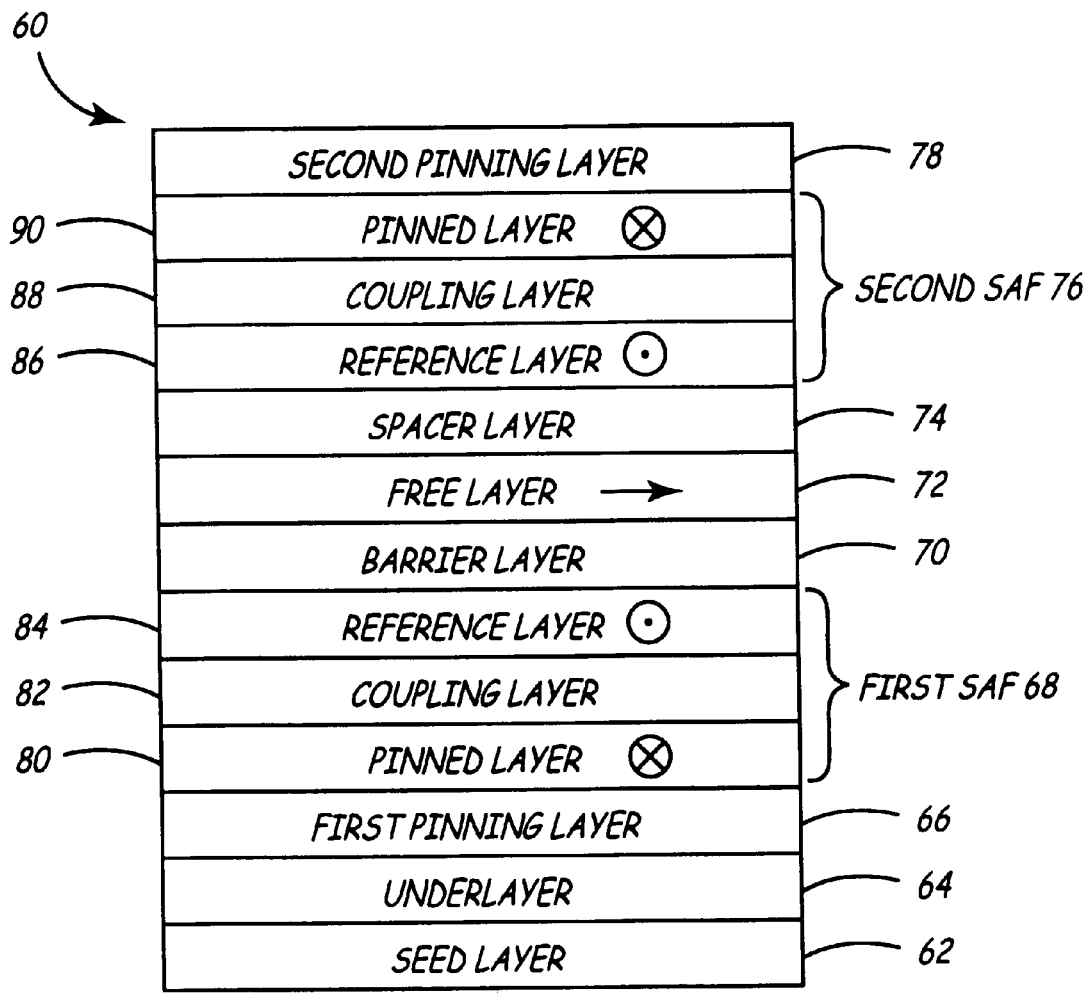
FIG. 3 is a layer diagram of a second embodiment of a tunneling magnetoresistive stack of the present invention.

FIG. 3 is a layer diagram of a second embodiment of a tunneling magnetoresistive (TMR) stack 60 of the present invention. TMR stack 60 includes a seed layer 62, an underlayer 64, a first pinning layer 66, a first synthetic antiferromagnet (SAF) 68, a barrier layer 70, a free layer 72, a spacer layer 74, a second SAF 76, and a second pinning layer 78. Seed layer 62 is preferably NiFeCr or Ta. Underlayer 64 is a ferromagnetic material, preferably CoFe or NiFe, and is positioned adjacent to seed layer 62. First pinning layer 66 is an antiferromagnetic material, preferably selected from the group consisting of PtMn, IrMn, NiMn and FeMn, and is positioned adjacent to underlayer 64. First SAF 68 includes a ferromagnetic pinned layer 80, a ferromagnetic reference layer 84, and a coupling layer 82 positioned between pinned layer 80 and reference layer 84. First SAF 68 is positioned such that pinned layer 80 is adjacent to first pinning layer 66. Pinned layer 80 is preferably CoFe, coupling layer 82 is preferably ruthenium, and reference layer 84 is preferably CoFe. Free layer 72 is a ferromagnetic material, preferably CoFe or NiFe. Barrier layer 70 is an insulating material, preferably selected from the group consisting of $Al_2O_3$, $Y_2O_3$, $CeO_2$, TaO, SiN, AlN, $CrO_2$, $HfO_2$, and $TiO_2$, and is positioned between first SAF 68 and free layer 72. Second SAF 76 includes a ferromagnetic reference layer 86, a ferromagnetic pinned layer 90, and a coupling layer 88 positioned between reference layer 86 and pinned layer 90. Second pinning layer 78 is an antiferromagnetic material, preferably selected from the group consisting of PtMn, IrMn, NiMn and FeMn, and is positioned adjacent to pinned layer 90 of second SAF 76. Spacer layer 74 is a nonmagnetic material, preferably Cu or Ag, and is positioned between free layer 72 and reference layer 68 of second SAF 76. Free layer 72, spacer layer 74, second SAF 76, and second pinning layer 78 together form a SAF spin valve.

The magnetizations of first and second SAFs 68 and 76 are fixed while the magnetization of free layer 72 rotates freely in response to an external magnetic field emanating from a magnetic medium. Reference layer 84 and pinned layer 80 are magnetically coupled by coupling layer 82 such that the magnetization direction of reference layer 84 is opposite to the magnetization direction of pinned layer 80.

The magnetization of pinned layer 80 is pinned by exchange coupling first pinning layer 66 with pinned layer 80. Underlayer 64 promotes the crystallographic texture of first pinning layer 66, and seed layer 62 enhances the grain growth of underlayer 64. Reference layer 86 and pinned layer 90 are magnetically coupled by coupling layer 88 such that the magnetization direction of reference layer 86 is opposite to the magnetization direction of pinned layer 90. The magnetization of pinned layer 90 is pinned by exchange coupling second pinning layer 78 with pinned layer 90. The magnetization direction of reference layer 84 is the same as the magnetization direction of reference layer 86. Similarly, the magnetization direction of pinned layer 80 is the same as the magnetization direction of pinned layer 90. The resistance of TMR stack 60 varies as a function of an angle that is formed between the magnetization of free layer 72 and the magnetizations of reference layers 84 and 86.

The TMR signal produced by TMR stack 60 is generated by a sense current flowing perpendicularly through the layers of TMR stack 60 from second pinning layer 78 to seed layer 62. The sense current injected into second pinning layer 78 is unpolarized. The SAF spin valve formed by free layer 72, spacer layer 74, second SAF 76, and second pinning layer 78 acts as an electrode to spin polarize the sense current. Because an external magnetic field from a magnetic medium rotates the magnetization of free layer 72, majority and minority spin electrons scatter at different rates at the interfaces between second SAF 76, spacer layer 74, and free layer 72. The resulting current emanating from free layer 72 to barrier layer 70 is spin polarized due to this spin selective scattering. As a result, the magnetoresistive effect of TMR stack 60 is significantly enhanced without appreciably increasing the RA product. Therefore, it is possible for TMR stack 60 to exhibit a MR ratio greater than 15% with an RA product of only $1-2\ \Omega\mu m^2$.

Although the present invention has been described with reference to preferred embodiments, workers skilled in the art will recognize that changes may be made in form and detail without departing from the spirit and scope of the invention.

What is claimed is:

1. A read sensor for use in a magnetic read head, the read sensor comprising:

a tunneling magnetoresistive (TMR) stack having a barrier layer, the TMR stack configured to operate in a current-perpendicular-to-plane (CPP) mode wherein a sense current flows substantially perpendicular to a longitudinal plane of the barrier layer; and means for causing the TMR stack to exhibit a magnetoresistive (MR) ratio greater than 15% and a resistance-area (RA) product less than $2\ \Omega\mu m^2$.

2. The read sensor of claim 1 wherein the means for causing the TMR stack to exhibit a MR ratio greater than 15% and a RA product less than $2\ \Omega\mu m^2$ includes a spin valve for spin polarizing the sense current.

3. The read sensor of claim 2 wherein the spin valve includes:

a ferromagnetic reference layer having a fixed magnetic moment;

a ferromagnetic free layer having a rotatable magnetic moment; and a nonmagnetic spacer layer positioned between the reference layer and the free layer.

4. The read sensor of claim 3 wherein the spin valve further includes an antiferromagnetic pinning layer positioned adjacent to the reference layer.

5. The read sensor of claim 2 wherein the spin valve includes:

a synthetic antiferromagnet;

a ferromagnetic free layer having a rotatable magnetic moment; and a nonmagnetic spacer layer positioned between the synthetic antiferromagnet and the free layer.

6. The read sensor of claim 5 wherein the synthetic antiferromagnet comprises:

a ferromagnetic pinned layer having a fixed magnetic moment;

a ferromagnetic reference layer having a fixed magnetic moment; and a coupling layer positioned between the pinned layer and the reference layer.

7. The read sensor of claim 5 wherein the spin valve further includes an antiferromagnetic pinning layer positioned adjacent to the synthetic antiferromagnet.

8. A read sensor for use in a magnetic read head, the read sensor comprising:

a tunneling magnetoresistive (TMR) stack having a barrier layer, the TMR stack configured to operate in a current-perpendicular-to-plane (CPP) mode wherein a sense current flows substantially perpendicular to a longitudinal plane of the barrier layer; and a spin valve in series with the barrier layer of the TMR stack for injecting a spin polarized sense current into the TMR stack for increasing a magnetoresistive (MR) ratio of the TMR stack, the spin valve including first and second ferromagnetic layers separated by a nonmagnetic electrically conductive spacer layer, wherein:

the first ferromagnetic layer is a reference layer having a fixed magnetic moment;

the second ferromagnetic layer is a free layer having a rotatable magnetic moment; and the nonmagnetic electrically conductive spacer layer is positioned between the reference layer and the free layer.

9. The read sensor of claim 8 wherein the spin valve further includes an antiferromagnetic pinning layer positioned adjacent to the reference layer.

10. A read sensor for use in a magnetic read head, the read sensor comprising:

a tunneling magnetoresistive (TMR) stack having a barrier layer, the TMR stack configured to operate in a current-perpendicular-to-plane (CPP) mode wherein a sense current flows substantially perpendicular to a longitudinal plane of the barrier layer; and a spin valve in series with the barrier layer of the TMR stack for injecting a spin polarized sense current into the TMR stack for increasing a magnetoresistive (MR) ratio of the TMR stack, the spin valve including first and second ferromagnetic layers separated by a nonmagnetic electrically conductive spacer layer, wherein:

the first ferromagnetic layer forms a part of a synthetic antiferromagnet;

the second ferromagnetic layer is a free layer having a rotatable magnetic moment;

and the nonmagnetic electrically conductive spacer layer is positioned between the synthetic antiferromagnet and the free layer.

11. The read sensor of claim 10 wherein the synthetic antiferromagnet comprises:

a ferromagnetic pinned layer having a fixed magnetic moment;

a ferromagnetic reference layer having a fixed magnetic moment; and a coupling layer positioned between the pinned layer and the reference layer.

12. The read sensor of claim 10 wherein the spin valve further includes an antiferromagnetic pinning layer positioned adjacent to the synthetic antiferromagnet.

13. A tunneling magnetoresistive (TMR) stack configured to operate in a current-perpendicular-to-plane (CPP) mode, the TMR stack comprising:

a spin valve having a pair of ferromagnetic layers separated by a nonmagnetic electrically conductive spacer layer;

a synthetic antiferromagnet comprising:

a ferromagnetic reference layer having a fixed magnetic moment;

a ferromagnetic pinned layer having a fixed magnetic moment; and a coupling layer positioned between the reference layer and the pinned layer;

a barrier layer positioned between the spin valve and the reference layer of the synthetic antiferromagnet; and an antiferromagnetic pinning layer positioned adjacent to the pinned layer of the synthetic antiferromagnet;

wherein the spin valve includes:

a ferromagnetic reference layer having a fixed magnetic moment; and a ferromagnetic free layer having a rotatable magnetic moment, wherein the free layer is positioned adjacent to the barrier layer; and wherein the nonmagnetic electrically conductive spacer layer is positioned between the reference layer and the free layer.

14. The TMR stack of claim 13 wherein the spin valve further includes an antiferromagnetic pinning layer positioned adjacent to the reference layer.

15. A tunneling magnetoresistive (TMR) stack configured to operate in a current-perpendicular-to-plane (CPP) mode, the TMR stack comprising:

a spin valve having a pair of ferromagnetic layers separated by a nonmagnetic electrically conductive spacer layer;

a synthetic antiferromagnet comprising:

a ferromagnetic reference layer having a fixed magnetic moment;

a ferromagnetic pinned layer having a fixed magnetic moment; and a coupling layer positioned between the reference layer and the pinned layer;

a barrier layer positioned between the spin valve and the reference layer of the synthetic antiferromagnet; and an antiferromagnetic pinning layer positioned adjacent to the pinned layer of the synthetic antiferromagnet;

wherein the spin valve includes:

a synthetic antiferromagnet; and a ferromagnetic free layer having a rotatable magnetic moment, wherein the free layer is positioned adjacent to the barrier layer; and wherein the nonmagnetic electrically conductive spacer layer is positioned between the synthetic antiferromagnet and the free layer.

16. The TMR stack of claim 15 wherein the synthetic antiferromagnet of the spin valve comprises:

a ferromagnetic pinned layer having a fixed magnetic moment;

a ferromagnetic reference layer having a fixed magnetic moment; and a coupling layer positioned between the pinned layer and the reference layer.

17. The TMR stack of claim 15 wherein the spin valve further includes an antiferromagnetic pinning layer positioned adjacent to the synthetic antiferromagnet.

* * * * *